US008810645B2

(12) United States Patent
Loeffler et al.

(10) Patent No.: US 8,810,645 B2
(45) Date of Patent: Aug. 19, 2014

(54) SYSTEM AND METHOD FOR THE PROFILING AND CALIBRATION OF FILM SCANNERS

(75) Inventors: Markus Eugen Loeffler, Alhambra, CA (US); Joshua Pines, San Francisco, CA (US); Chris Kutcka, Pasadena, CA (US)

(73) Assignee: Thomson Licensing, Issy-les Moulineaux (FR)

( * ) Notice: Subject to any disclaimer, the term of this patent is extended or adjusted under 35 U.S.C. 154(b) by 407 days.

(21) Appl. No.: 13/375,031

(22) PCT Filed: Jun. 1, 2009

(86) PCT No.: PCT/US2009/045827
§ 371 (c)(1),
(2), (4) Date: Nov. 29, 2011

(87) PCT Pub. No.: WO2010/141006
PCT Pub. Date: Dec. 9, 2010

(65) Prior Publication Data
US 2012/0069175 A1 Mar. 22, 2012

(51) Int. Cl.
H04N 9/11 (2006.01)
H04N 17/02 (2006.01)
H04N 5/253 (2006.01)
H04N 1/60 (2006.01)

(52) U.S. Cl.
CPC .............. *H04N 5/253* (2013.01); *H04N 9/11* (2013.01); *H04N 17/02* (2013.01); *H04N 1/6055* (2013.01)
USPC ........................................................ 348/104

(58) Field of Classification Search
None
See application file for complete search history.

(56) References Cited

U.S. PATENT DOCUMENTS

| 5,049,984 | A | * | 9/1991 | Moore et al. ................... 348/104 |
| 5,406,325 | A | * | 4/1995 | Parulski et al. ................. 348/97 |
| 5,420,979 | A | | 5/1995 | Madden et al. |
| 5,452,112 | A | * | 9/1995 | Wan et al. ...................... 358/504 |
| 5,481,657 | A | * | 1/1996 | Schubert et al. ............... 345/418 |
| 5,537,516 | A | * | 7/1996 | Sherman et al. ............... 358/1.9 |
| 5,946,407 | A | * | 8/1999 | Bamberger et al. ........... 382/132 |
| 6,459,825 | B1 | * | 10/2002 | Lippincott .................... 382/312 |
| 6,462,835 | B1 | * | 10/2002 | Loushin et al. ................ 358/1.9 |

(Continued)

FOREIGN PATENT DOCUMENTS

| GB | 2407932 | 5/2005 |
| JP | H04504042 | 7/1992 |

(Continued)

OTHER PUBLICATIONS

Search Report dtd Feb. 24, 2010.

*Primary Examiner* — William C Vaughn, Jr.
*Assistant Examiner* — Luis M Perez
(74) *Attorney, Agent, or Firm* — Robert D. Shedd; Vincent E. Duffy; Michael A. Pugel

(57) ABSTRACT

A system and method for calibrating a production film scanner is provided. The system and method provides for providing at least one first calibration frame on an intermediate film stock providing at least one second calibration frame on a negative film stock, scanning the at least first and second calibration frames with a reference film scanner, scanning the at least first and second calibration frames with a production film scanner, and determining a compensation calibration factor from a first result of the scanning with the reference film scanner and a second result of the production film scanner.

12 Claims, 4 Drawing Sheets

(56) References Cited

U.S. PATENT DOCUMENTS

| | | | |
|---|---|---|---|
| 6,683,981 B1 * | 1/2004 | Matama | 382/167 |
| 6,909,454 B2 * | 6/2005 | Hunt | 348/96 |
| 7,369,273 B2 * | 5/2008 | Madden | 358/1.9 |
| 7,542,168 B2 * | 6/2009 | Goma et al. | 358/1.9 |
| 7,751,083 B2 * | 7/2010 | Jasinski et al. | 358/1.9 |
| 8,045,241 B2 * | 10/2011 | Cho | 358/518 |
| 2003/0081117 A1 | 5/2003 | Bogdanowicz et al. | |
| 2006/0146130 A1 | 7/2006 | Cirulli et al. | |
| 2007/0223064 A1 | 9/2007 | Ichitani | |

FOREIGN PATENT DOCUMENTS

| | | |
|---|---|---|
| JP | 2002262007 | 9/2002 |
| JP | 2007259123 | 9/2007 |
| JP | 2008-232665 | 10/2008 |
| WO | WO9110316 | 7/1991 |

* cited by examiner

SYSTEM AND METHOD FOR THE PROFILING AND CALIBRATION OF FILM SCANNERS

This application claims the benefit under 35 U.S.C. §365 of International Application PCT/US2009/045827 filed Jun. 1, 2009, published in accordance with PCT article 21(2) on Dec. 10, 2010.

TECHNICAL FIELD OF THE INVENTION

The present disclosure generally relates to film production processing and display systems, and more particularly, to a system and method for profiling and calibration of film scanners.

BACKGROUND OF THE INVENTION

Initially, in the motion picture industry, an original motion picture negative film was exposed during a camera exposure operation, developed into a processed camera negative and subsequently operated upon in one of several ways to produce an imagery product. In such prior art analog systems, film dailies or rushes were conventionally produced as a motion picture was shot. These dailies or rushes were processed and then viewed by the director, the producer, the film editor, etc. working on the production to determine whether the scenes shot were acceptable. Each person on the production team assessed the dailies for different elements relevant to their respective roles in the team. The cinematographers and directors could see the results of the previous day's work in a format that faithfully "previewed" what the final release could look like.

Generally, in creating dailies, raw, unedited footage is developed, synched to sound, and printed on film in a batch. Alternatively, the raw footage is scanned or telecined onto video tape or disk. In the movie making process, several film scanners and/or telecines may be used in different locations. For example, dailies may be telecined on one particular model of telecine at a remote film location, whereas the final high-resolution scanning for the final digital intermediate might be done at the production studio on a scanner.

Conventionally, a target frame generated on intermediate film stock is used to calibrate scanners of various models and manufacturers. Unfortunately, the spectral response of the intermediate stock is different from camera original film stocks. Even though different brands of scanners can be calibrated to respond identically to standard intermediate film stock, the scanners will still react differently to camera original film stocks, which have different spectral dye characteristics. Discrepancies between telecined images for dailies and film scans for final color correction have to be addressed by a colorist during the final color correction.

Therefore, a need exists for techniques for profiling and calibrating film scanners so that telecined dailies and film scans match and requiring no further pre-processing.

SUMMARY

The present disclosure provides a system and method of calibrating film scanners and telecines of various models and manufacturers to a defined profile. The calibration system and method involve a customized calibration film strip and scanners able to generate digital image files. One film scanner is chosen to be the target reference device, and a method is provided to calibrate "production" film scanners and telecines to generate images which match those from the target scanner. The calibration method requires two images or frames to be captured, the first frame consists of a number of gray patches on intermediate film stock (e.g. Kodak 5242 film), the second frame includes a color chart (e.g. Macbetch) exposed on a target negative film stock (e.g. Kodak 5219 film). The calibration method uses the two scanned frames and a target profile for the gray patches to calculate a calibration color lookup table (LUT). This LUT is then used to post-process all scanned images. By using the target negative film stock as part of the calibration process, the metamerism due to the spectral sensitivities of different film scanners, which all have different spectral sensitivity curves, is overcome.

According to one aspect of the present disclosure, a method for calibrating a production film scanner is provided, the method including providing at least one first calibration frame on an intermediate film stock, providing at least one second calibration frame on a negative film stock, scanning the at least first and second calibration frames with a reference film scanner, scanning the at least first and second calibration frames with a production film scanner, and determining a compensation calibration factor from a first result of the scanning with the reference film scanner and a second result of the production film scanner.

In another aspect, the compensation calibration factor is a calibration color lookup table (LUT).

In yet another aspect, the compensation factor is applied to at least one production image on the negative film stock scanned by the production film scanner.

In a further aspect, the at least one first calibration frame includes a plurality of color patches covering the full dynamic range of the intermediate film stock and the at least one second calibration frame includes a color chart including a plurality of color patches.

In another aspect of the present disclosure, the method includes analyzing the first result of the scanning of the at least one second frame with the reference film scanner, determining a first set of target aim values for each of the plurality of color patches, analyzing the second result of the scanning of the at least one second frame with the production film scanner, determining a second set of values for each of the plurality of color patches, and computing a least square fit between the first and second set of values. The method further includes concatenating the least square fit with the first non-linearity calibration values of the production film scanner and storing the result as the compensation calibration factor.

According to another aspect of the present disclosure, a system for calibrating a production film scanner is provided. The system includes at least one first calibration frame on an intermediate film stock, at least one second calibration frame on a negative film stock, a reference film scanner for scanning the at least first and second calibration frames, a production film scanner for scanning the at least first and second calibration frames, and a processor for determining a compensation calibration factor from a first result of the scanning with the reference film scanner and a second result of the production film scanner.

In a further aspect, the system includes a color space converter for applying the compensation calibration factor to at least one production image on the negative film stock scanned by the production film scanner, wherein the compensation calibration factor is a calibration color lookup table.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
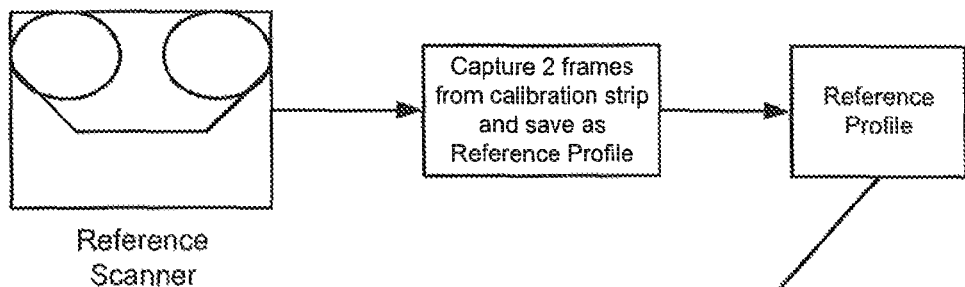
FIG. 1 illustrates a workflow diagram for calibrating a production film scanner according to an aspect of the present disclosure.
Figure 1:
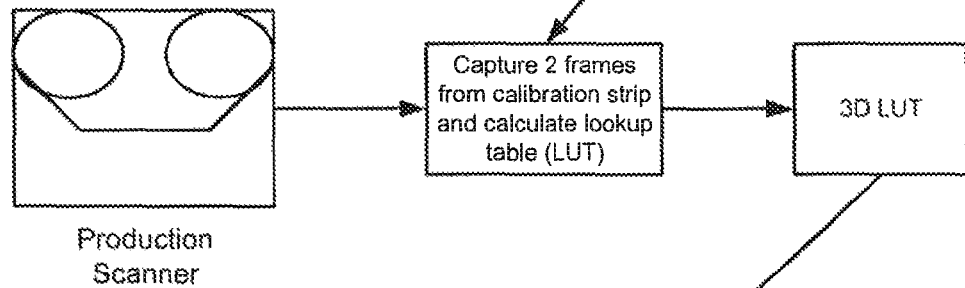
Figure 1:
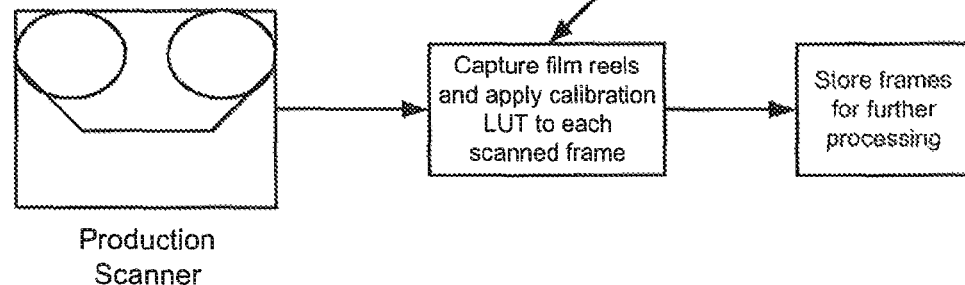

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure provides a system and method for profiling and calibration of film scanners. Referring to FIG. 1, a general workflow diagram for calibrating a production film scanner according to an aspect of the present disclosure is provided. In step 1, a reference profile for the reference film scanner is generated. The reference film scanner scans or captures two frames from a calibration film strip and saves the captured frames as a reference profile. In step 2, a production scanner scans the same two frames from the calibration film strip to generate a production profile. A color correction factor or color calibration lookup table (LUT) is then created from the reference profile and the production profile. In step 3, the production scanner now captures film reels and the LUT is applied to each scanned frame of the film reels to calibrate each frame. The calibrated frames are then stored for further processing.

Figure 2:
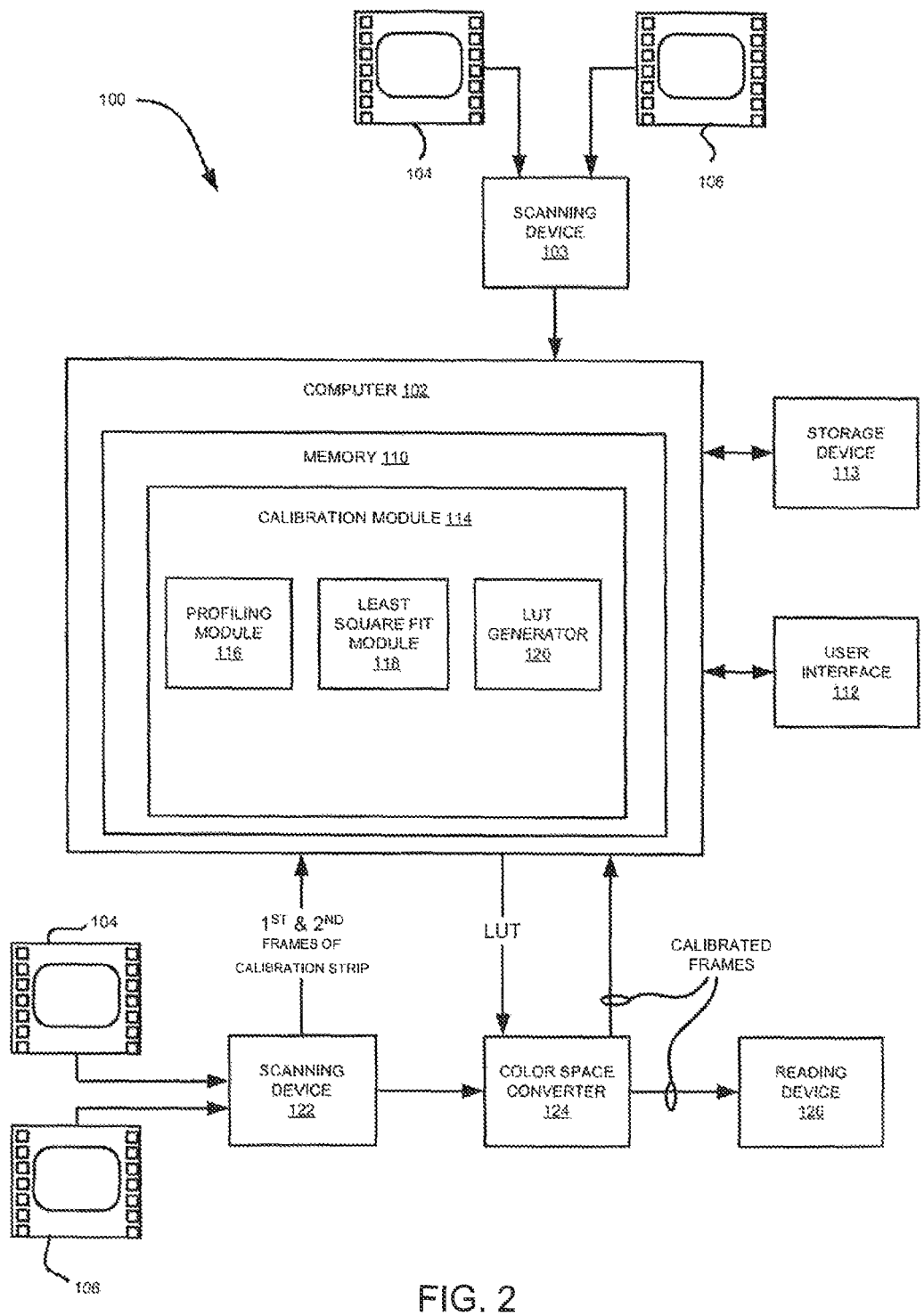
FIG. 2 is an exemplary illustration of a system for calibrating a production film scanner according to an aspect of the present disclosure.
Figure 3:
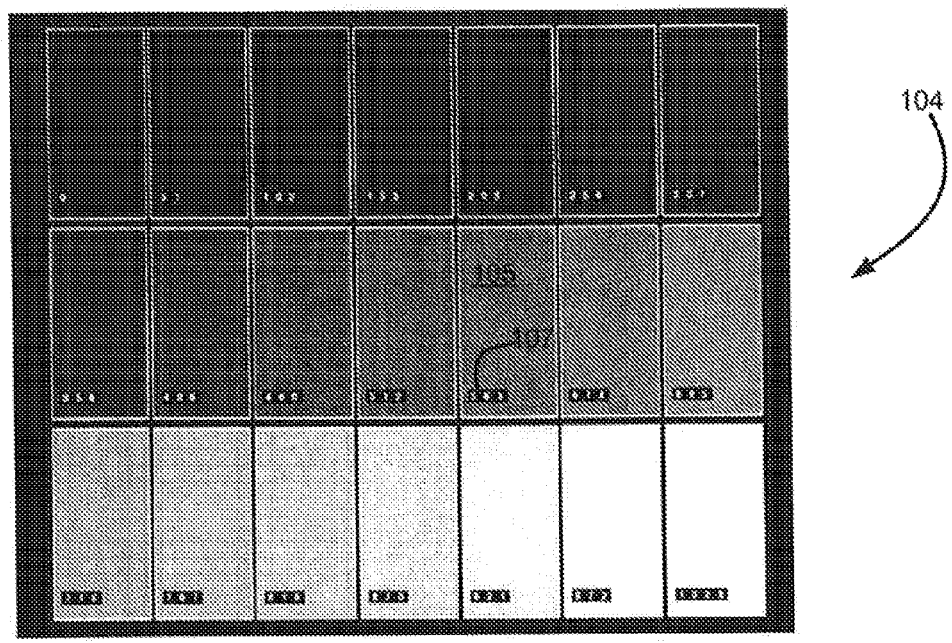
FIG. 3 illustrates a first calibration frame including 21 grey patches on intermediate film stock.
Figure 4:
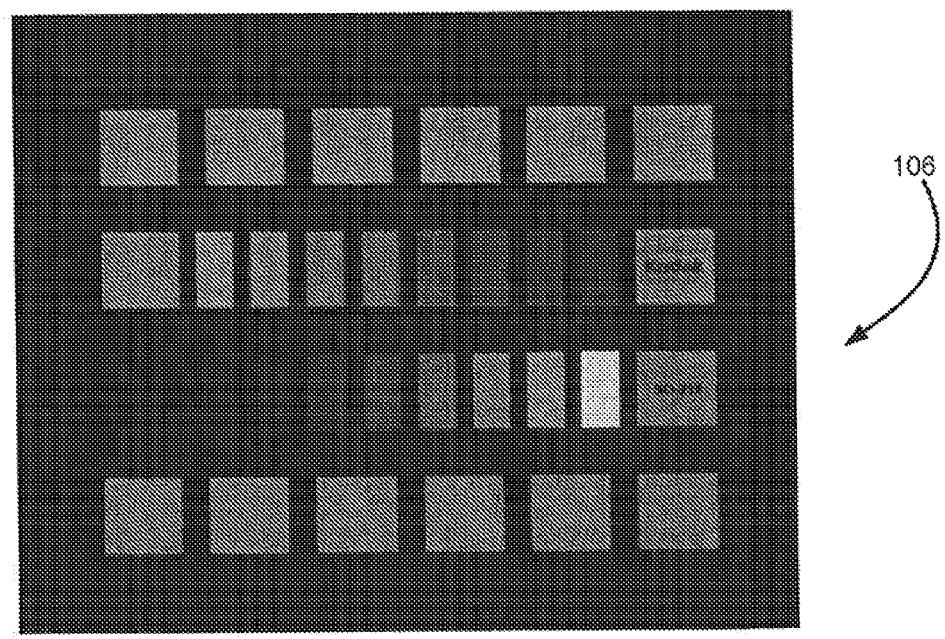
FIG. 4 illustrates a second calibration frame including a plurality of color patches on a negative film stock.

Referring now to FIG. 2, exemplary system components according to an embodiment of the present disclosure are shown. A scanning device 103 may be provided for scanning film prints, e.g., camera-original film negatives, into a digital format, e.g. Cineon-format or SMPTE DPX files. The scanning device 103 may comprise, e.g., a telecine or any device that will generate a video output from film such as, e.g., a Spirit™ HD scanner with video output. The scanning device 103, e.g., a reference scanner, will scan a first frame 104 including a plurality of grey patches and a second frame 106 including a plurality of color patches. An exemplary first frame is shown in FIG. 3 and an exemplary second frame is shown in FIG. 4, the details of which will be described below.

Scanned film prints or frames are input to a post-processing device 102, e.g., a computer, via a HD-SDI capture card. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse or joystick) and display device. The computer platform also includes an operating system and micro instruction code. The various processes and functions described herein may either be part of the micro instruction code or part of a software application program (or a combination thereof) which is executed via the operating system. In one embodiment, the software application program is tangibly embodied on a program storage device, which may be uploaded to and executed by any suitable machine such as post-processing device 102. In addition, various other peripheral devices may be connected to the computer platform by various interfaces and bus structures, such a parallel port, serial port or universal serial bus (USB). Other peripheral devices may include additional storage devices 113 and a printer. The printer may be employed for printing a revised version of the scanned film.

A software program includes a calibration module 114 stored in the memory 110 for profiling and calibrating film scanners. The calibration module 114 includes a profiling module 116 for creating a profile of a film scanning device. The profiling module 116 will receive the scanned first frame 104 to perform a conventional calibration for the scanning device 103 and receive and analyze the scanned second frame 106 to provide target aim values, e.g., RGB values.

The calibration module 114 further includes a least square fit module 118 for performing a least square fit calculation between RGB values of two different scanners. A lookup table (LUT) generator 120 generates a lookup table (LUT) by concatenating a result of the least square fit calculations with a standard calibration of a target scanning device.

The system 100 further includes a second scanning device 122, e.g., a production scanner, for capturing reels of film. A color space converter 124 is provided for applying the lookup table (LUT) to captured frames of a film. An exemplary color space converter is a LUTher™ color space converter commercially available from Thomson Grass Valley of France. The color space converter 124 outputs the calibrated images or frames into the local image productions pipeline such as a reading device 126, e.g., a tape deck. The color space converter 124 may also output the calibrated images or frames to the processing device 102 for storing to the storage device 113.

Figure 5:
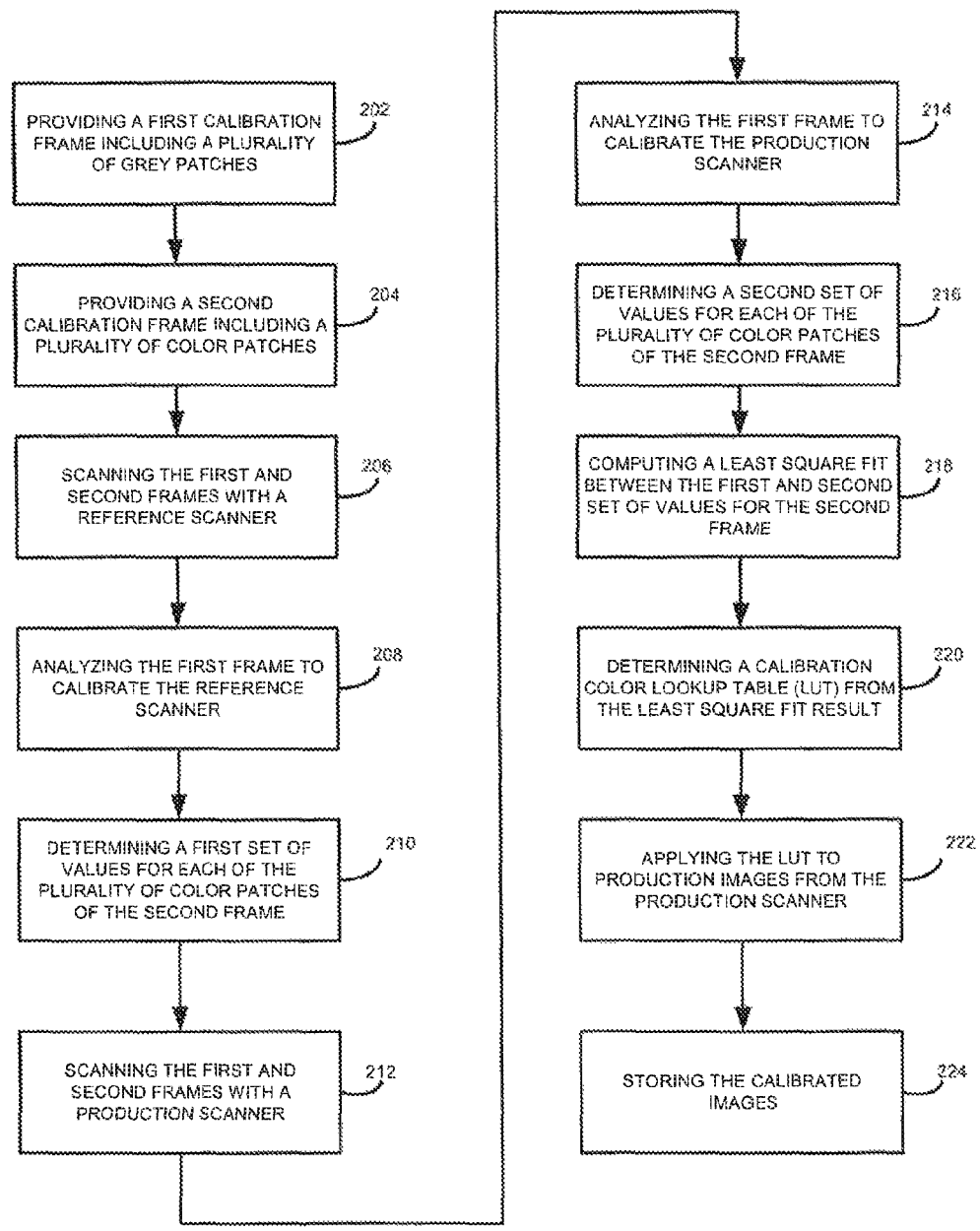
FIG. 5 is a flow diagram of an exemplary method for calibrating a production film scanner according to an aspect of the present disclosure.

Referring to FIG. 5, a flow diagram of an exemplary method for calibrating a production film scanner according to an aspect of the present disclosure is illustrated. Initially, a response of a target reference scanner 103 to a specific film stock is defined. A film strip containing one overall calibration frame plus several "correction" calibration frames, each of which represents specific camera original film stocks are provided. A first calibration frame 104 is provided including a plurality of colors patches covering the full dynamic range of the intermediate film stock (step 202) and a second calibration frame 106 is provided including a plurality of color patches (step 204). The two frames in the calibration strip are scanned on the reference scanner 103 under standard calibration and are stored without any modification (step 206).

Referring to FIGS. 3 and 4, the first frame 104 consists of 21 gray patches representing ½ stop increments on intermediate film stock (e.g. Kodak 5242 film) and the second frame 106 shows a color chart (e.g. a Macbetch color checker or "TAF" frame) exposed on the specific negative film stock (e.g. Kodak 5219 film). It is to be appreciated that although the first frame 104 is shown with 21 grey patches, the patches can be of any color or number as along as the full dynamic range of the intermediate film stock is represented. Conventionally, calibration materials can be generated on intermediate stock, but conventional systems are stuck using the film manufacturer's supplied test images for the real camera original stocks—which is why the intermediate frame has so many more patches. A high-precision calibration is performed against the intermediate stock, and then the camera original stock calibration frame is used to adjust for any metamerism. Metamerism, in this case, refers to the fact that if two different scanners have different spectral sensitivities, and they are calibrated to produce equal results from one specific film stock, that doesn't guarantee that they will produce equal results from a different film stock with different spectral transmissive characteristics.

The scan of the first frame 104, including the 21 grey patches, is analyzed and use to correct for any nonlinearities of the scanner (step 208). As can be seen in FIG. 3, each patch 105 includes a number 107 which represents the RGB value in 10 bit used to print the grey patch. The grey patches have know densities and these densities are used to create a linear response of the optical sensor inside the scanner, i.e., this first calibration step forces the scanning device to produce the code values indicated by the aforementioned numbers 107 for each patch 105. Once this first calibration step is performed, the second scan of the second color patch frame 106 is analyzed to provide the target aim values, e.g., RGB values, to be used when calibrating other scanners to match the reference scanner (step 210).

The above procedure is repeated—the same two frames are scanned—but this time on the second scanning device 122, i.e., the production scanner. The first frame 104, including the 21 grey patches, is scanned and analyzed to create a standard calibration (step 212), similar to the calibration described above in relation to step 208. At this point, the production scanner 122 will match the reference target scanner, but only when scanning intermediate film. Next, the color patch frame 106 of a specific film stock in which will be used for production is scanned (step 214). This scan is analyzed and a set of RGB values for the production scanner 122 is determined (step 216). A least square fit is computed against the target aim values from the target reference scanner 103 and the values of from the production scanner 122 (step 218). The results of this least square fit are concatenated with the standard calibration of the second scanner from step 214 (step 220). The result is a compensation calibration factor or calibration lookup table (LUT) calculated to compensate for the differences between the production scanner 122 and the reference scanner 103. The calibration lookup table (LUT) can be a 1D or 3D RGB calibration lookup table (LUT) which maps the received RGB values from an optical sensor of a scanner to the desired RGB colors of the reference model.

In the case of telecine transfers, the calibration lookup table (LUT) is uploaded into the color space converter 124, e.g., a LUTher™ box. The color space converter 124 applies the calibration lookup table (LUT) to each image or frame received from the production scanner 122 (step 222). The output of the color space converter 124 produces a calibrated image that matches the reference, i.e., the reference scanner 103. The output of the color space converter 124 may be provided to a reading device 126 or to the computer 102 for storage in the storage device 113 (step 224). In the case of file based film scanning (where images are written as files directly on a storage device), the calibration lookup table (LUT) is loaded into the final output processing of the production scanner itself, i.e., the color space converter is built into the scanning device, and an external color space converter is not required. In both cases, no additional time is needed to "post-process" the images. Implementing the described workflow introduces a minimal amount of additional work to the scanning operators and can be performed on a daily basis.

Using the techniques of the present disclosure, a specific film stock can be scanned in different facilities worldwide on different production scanners and produce identical results. Also, dailies produced on a video based telecine can be matched downstream when the film is scanned on a different device for the final digital intermediate color correction.

Although embodiments which incorporates the teachings of the present disclosure have been shown and described in detail herein, those skilled in the art can readily devise many other varied embodiments that still incorporate these teachings. Having described preferred embodiments of a system and method for profiling and calibration of film scanners (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method for calibrating a production film scanner, the method comprising:
    providing at least one first calibration frame on an intermediate film stock,
    the at least one first calibration frame includes a plurality of color patches covering the full dynamic range of the intermediate film stock, each of the plurality of color patches is a different shade of grey;
    providing at least one second calibration frame, each one of the at least one second calibration frame including a plurality of color patches exposed on a negative film stock;
    scanning the at least one first and second calibration frames with a reference film scanner;
    analyzing the at least one first calibration frame scanned with the reference film scanner to calibrate the reference film scanner;
    determining a first set of target aim values for each of the plurality of color patches for the at least one second calibration frame scanned with the reference film scanner;
    scanning the at least one first and second calibration frames with a production film scanner;
    analyzing the at least one first calibration frame scanned with the production film scanner to calibrate the production film scanner for the intermediate film stock;
    determining a second set of target aim values for each of the plurality of color patches for the at least one second calibration frame scanned with the production film scanner; and
    determining a compensation calibration color lookup table for the production film scanner from the first set of target aim values determined from the scanning with the reference film scanner and the second set of target aim values determined from the scanning with the production film scanner.

2. The method of claim 1, further comprising: computing a least square fit between the first and second set of target aim values.

3. The method of claim 2, wherein the analyzing the at least one first calibration frame scanned with the production film scanner further includes determining first calibration values for the production film scanner from the first result of the scanning of the at least one first calibration frame, wherein the first calibration values compensate for non-linearities of the production film scanner.

4. The method of claim 3, further comprising concatenating the least square fit with the first calibration values of the production film scanner and storing the result as the compensation calibration factor color lookup table for the production film scanner.

5. The method of claim 1, further comprising applying the compensation calibration color lookup table to at least one production image on the negative film stock scanned by the production film scanner.

6. The method of claim 1, further comprising:
    scanning a plurality of production images on the negative film stock by the production film scanner;
    applying the calibration color lookup table to each of the plurality of production images; and storing the calibrated plurality of production images for further processing.

7. A system for calibrating a production film scanner, the system comprising:
    at least one first calibration frame on an intermediate film stock, the at least one first calibration frame includes a plurality of color patches covering the full dynamic range of the intermediate film stock, each of the plurality of color patches is a different shade of grey;
    at least one second calibration frame on a negative film stock, each one of the at least one second calibration frame including a plurality of color patches exposed on the negative film stock:
    a reference film scanner for scanning the at least one first and second calibration frames;
    a production film scanner for scanning the at least one first and second calibration frames; and
    a processing device that analyzes the at least one first calibration frame scanned with the reference film scanner to calibrate the reference film scanner, determine a first set of target aim values for each of the plurality of color patches for the at least one second calibration frame scanned with the reference film scanner, analyzes the at least one first calibration frame scanned with the production film scanner to calibrate the production film scanner for the intermediate stock, determines a second set of target aim values for each of the plurality of color patches for the at least one second calibration frame scanned with the production film scanner and determines a compensation calibration lookup table for the production film scanner from the first set of target aim values determined from the scanning with the reference film scanner and the second set of target aim values determined from the scanning with the production film scanner.

8. The system of claim 7, wherein the processing device is further adapted to compute a least square fit between the first and second set of target aim values.

9. The system of claim 8, wherein the processing device is further adapted for determining first calibration values for the production film scanner from first result of the scanning of the at least one first calibration frame, wherein the first calibration values compensate for non-linearities of the production film scanner.

10. The system of claim 9, wherein the processing device is further adapted for concatenating the least square fit with the first calibration values of the production film scanner and storing the result as the compensation calibration color lookup table in a color space converter.

11. The system of claim 7, further comprising a color space converter for applying the compensation calibration color lookup table to at least one production image on the negative film stock scanned by the production film scanner.

12. The system of claim 7, wherein the production scanner scans a plurality of production images on the negative film stock, the color space converter applies the calibration color lookup table to each of the plurality of production images and the processing device stores the calibrated images into a storage device.

\* \* \* \* \*